United States Patent [19]

Booth et al.

[11] 4,068,949

[45] Jan. 17, 1978

[54] DOCUMENT HANDLING DEVICE

[75] Inventors: Richard A. Booth, Norwalk; Denis C. Weil, Wilton, both of Conn.; Daniel N. Yanofsky, Jericho, N.Y.

[73] Assignee: Pitney-Bowes, Inc., Stamford, Conn.

[21] Appl. No.: 701,243

[22] Filed: June 30, 1976

[51] Int. Cl.² ............................................. G03B 27/62
[52] U.S. Cl. ..................................... 355/75; 271/145; 271/167; 355/51
[58] Field of Search ....................... 355/50, 51, 75, 64; 271/207, 145, 149, 167; 211/72

[56] References Cited

U.S. PATENT DOCUMENTS

| | | | |
|---|---|---|---|
| 3,597,076 | 8/1971 | Hubbard et al. | 355/51 X |
| 3,623,806 | 11/1971 | Short | 355/75 X |
| 3,891,315 | 6/1975 | Kolibas | 355/75 X |

*Primary Examiner*—Richard A. Wintercorn

*Attorney, Agent, or Firm*—Thomas R. FitzGerald; William D. Soltow, Jr.; Albert W. Scribner

[57] ABSTRACT

Document handling device for placement onto an existing reciprocating document carriage of a photocopy machine to provide support for photocopying documents such as billing statement ledger cards. The document handling device is of one piece construction having a recessed inclined staging tray for storage of documents prior to photocopying, a steeply inclined surface portion with document retainer surface projections for separating and feeding of documents, a transparent document exposure access to coincide with a transport window of the reciprocating document carriage, and a recessed inclined stacker tray for storing documents which have been photocopied. The document handling device has two bottom projections to fit into existing indentations of the reciprocating document carriage and a cutout portion to accommodate a copy sheet length selector knob located on the reciprocating document carriage.

9 Claims, 3 Drawing Figures

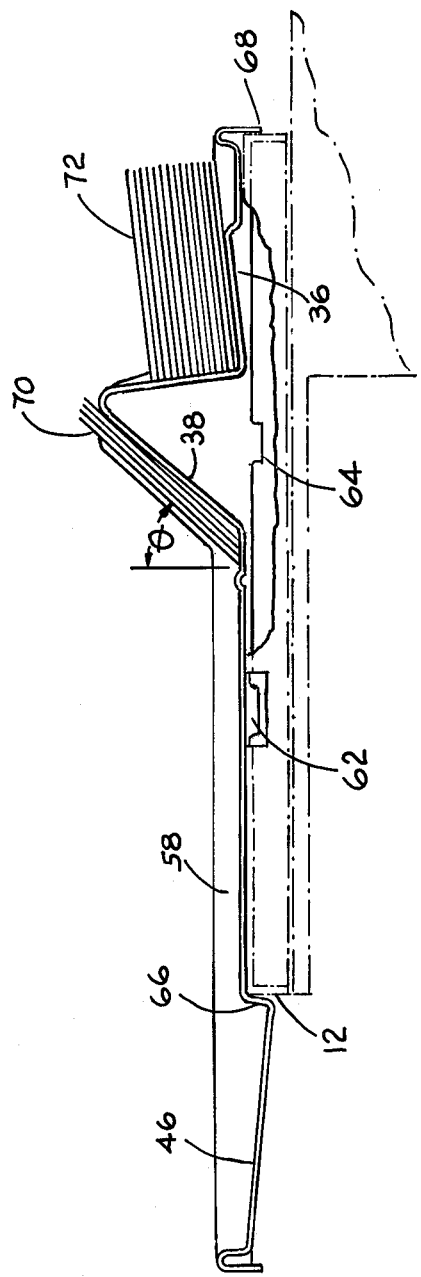
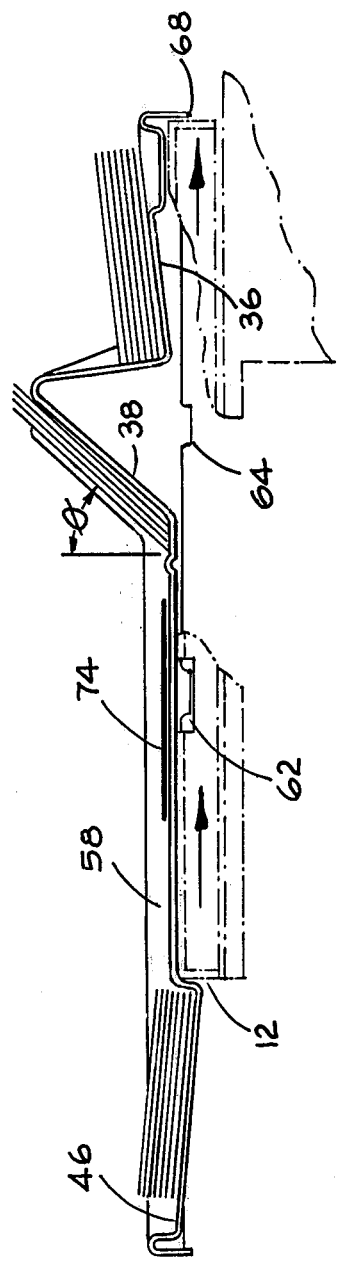

DOCUMENT HANDLING DEVICE

BACKGROUND OF THE INVENTION

1. Field of the Invention

The present invention relates generally to improvements for a photocopy machine, and more particularly, pertains to a document handling device apparatus for placement onto a reciprocating document carriage of a photocopy machine for photocopying documents such as billing statement ledger cards.

2. Description of the Prior Art

In the field of photocopying, it has been a general practice to photocopy various sizes of documents, particularly those denoted in the art as billing statement ledger cards such as those commonly utliized by doctors. The most common size of document utilized by doctors is the 5½ × 8½ inches billing statement ledger card which is now considered the industry standard size to which most billing systems are oriented. The term "document" used in this specification is not to be limited to only billing statement ledger cards, but is to also include documents such as invoices, purchase orders, etc. which have similar dimensions.

In the past, documents such as billing statement ledger cards were photocopied on a one-by-one individual basis by manually lifting a cover, usually a rubber mat to shield the exposure access window covering the reciprocating document carriage of the photocopy machine; manually inserting and positioning a billing statement ledger card therebetween the cover and a transparent glass cover of the carriage; making a predetermined number of photocopies of the statement ledger card, usually one; again raising the cover; and, finally, manually removing the photocopied billing statement ledger card. The order of manual steps is again repeated for each individual document to be photocopied which is less than satisfactory as this resulted in an expenditure of large amounts of time and laboring energy with respect to all the manual manipulations required to photocopy each individual billing statement ledger card in addition to being extremely tedious and boring to the photocopy machine operator.

Time-motion studies have shown the photocopying billing statement ledger cards as described above is expensive, but yet not too expensive to warrant photocopier users such as doctors justification to purchase expensive complex photocopying equipment, especially in view of a limited number of billing statement ledger cards to be photocopied and mailed to their respective accounts each month. For these reasons, many offices continue to go through the time consuming motions necessary to photocopy billing statement ledger cards.

This invention fills the need for a document support apparatus to reduce time, labor, and manual manipulations required in photocopying a plurality of documents such as billing statement ledger cards.

SUMMARY

The general purpose of this invention is a document handling device for placement onto a reciprocating document carriage of a photocopy machine to provide support for facilitating manipulation of a plurality of documents for successively copying the documents with least time-motion expenditure.

This invention is a document handling device for placement onto an existing reciproacting document carriage of a photocopy machine having a generally rectangular body member dimensioned to rest and mate with the reciprocating document carriage of the photocopy machine, a recessed incline staging tray for a storage of documents prior to photocopying, a steeply inclined surface portion at an oblique angle to the carriage for supporting and shingling individual documents across a transparent copy exposure window, and a recessed inclined stacker tray to receive photocopied documents. Document retainer surface projections between the inclined surface and the transparent copy exposure access window separate each document prior to feeding a single document to the transparent copy exposure window. A rear wall of the document support apparatus contains the cards during this copying sequence. Two projections extending from the bottom of the document support apparatus fit into identations in the existing reciprocating document carriage of the photocopier in addition to a cutout portion located on the front of the document support apparatus to accommodate a copy sheet length selector knob. A lip on each end of the document support apparatus mates with the edges of the reciprocating document carriage.

An object of the present invention is to provide a document handling device for facilitating manipulation of a plurality of documents such as billing statement ledger cards for successively copying said documents on a photocopy machine having a reciprocating document carriage operating with a copying stroke and a reverse non-copying stroke with least time-motion.

Another object is to provide apparatus for photocopying each individual document in conjunction with a left to right copying stroke or visa-versa reciprocation movement of the reciprocating document carriage which is utilized to aid in advancement of each document from an inclined surface portion to a transparent copy exposure window and hence to a recessed inclined stacker tray. The copy stroke and reverse non-copy stroke are utilized to facilitate the manipulation of documents down the steeply inclined surface over the surface projections to the exposure access window and then to a stacker tray. The surface projections assist in separating and feeding the cards to the window. The movement of the reciprocating document carriage supplies the necessary motion to manipulate each statement ledger card.

A further object of the invention is to provide a document handling device which utilizes the existing insertion points in the reciprocating document carriage of the photocopy machine. The physical shape of the reciprocating document carriage of the photocopy machine mates with the generally rectangular body member of the reciprocating document carriage.

Still another object is to provide a document handling device which requires minimum time-motion of an operator's hand movement in addition to an apparatus which allows for semi-automatic fast continuous flow through of documents such as statement billing ledger cards over a transparent copy exposure window of a photocopy station. The feature of this invention is that an operator does not need to move either hand hardly at all as movement for each statement ledger card is transferred from the reciprocating copy stroke and reverse non-copy stroke of the document carriage to each card through the operator's hand. An operator need only position the cards over the appropriate surface portion such as from the copy exposure window to the staging window.

BRIEF DESCRIPTION OF THE DRAWING

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 2 illustrates a cross-section side view of the apparatus of FIG. 1 prior to feeding of a document such as billing statement ledger card to a transparent document exposure station; and FIG. 3 illustrates a cross-section side view of the apparatus of FIG. 1 with documents such as a billing statement ledger card positioned at the transparent document exposure station.

DESCRIPTION OF THE PREFERRED EMBODIMENTS

Figure 1:
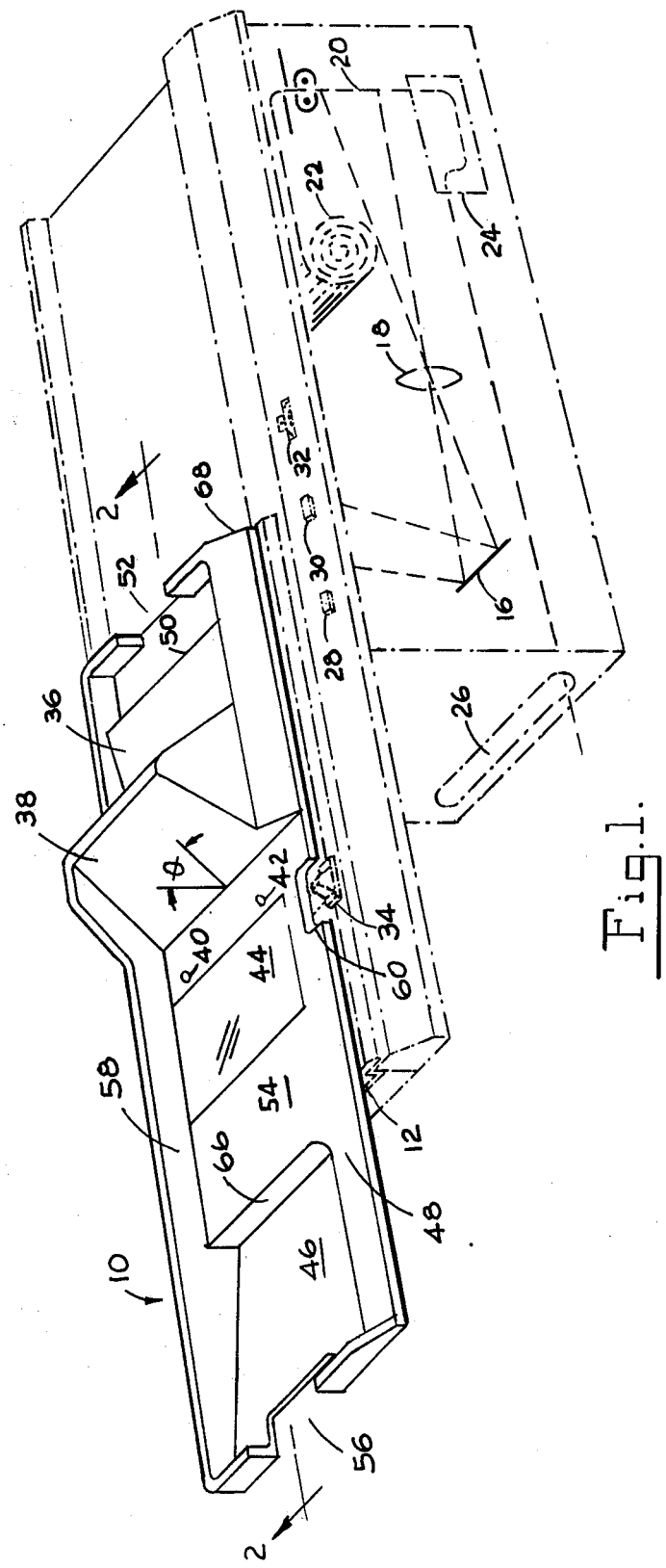
FIG. 1 illustrates a perspective view of the document handling device of the present invention, positioned on a reciprocating document carriage of a photocopier.

FIG. 1 illustrates a preferred embodiment showing a perspective view of the document handling device 10 positioned on the reciprocating document carriage 12 of a photocopy machine 14. The reciprocating document carriage 12 of the photocopy machine 14 is disclosed in U.S. Pat. No. 3,697,165, issued to Morriston et al on Oct. 10, 1972, assigned to the same assignee as this application. The document handling device 10 can be positioned on any reciprocating document carriage of any photocopy machine regardless of whether the machine utilizes coated paper or plain bond paper. Internal to this particular photocopy machine 14 is a mirror 16 which reflects an image from an exposure station (not shown) through lens 18 onto paper 20 from paper supply 22. A developer station 24 develops the image transferred to the paper 20 whereupon the photocopy is discharged at outlet 26. A POWER switch 28 supplies electrical power to the photocopy machine 14, a PRINT switch 30 actuates the reciprocation of document carriage 12, and NUMBER OF COPIES selector 32 sets the number of photocopies of each document. A copy sheet length selector knob 34 slidably mounts on the reciprocating document carriage 12 to determine the length of each photocopy; in this instance, from the range of 5 to 14 inches.

The document handling device 10 consists of in line from right to left, a recessed inclined staging tray 36, a steeply inclined surface portion 38 with document retainer surface projections 40 and 42, a transparent document copy exposure access 44 and a recessed inclined stacker tray 46 for receiving photocopied documents such as billing statement ledger cards affixed onto a support base 48 which is a generally rectangular body member dimensioned to fit and rest upon the reciprocating document carriage 12 of the photocopy machine 14.

The inwardly recessed inclined staging tray 36 is at an oblique angle to exposure access 44 having one end 50 extending upwardly from a base 48 thereby permitting underneath access to documents to be photocopied such as billing statement ledger cards through access opening 52 permitting insertion of an operator's hand. Staging tray 36 may be any generally horizontal surface portion adjacent one end of the support base 48. The steeply inclined surface 38 has an angle $\theta$ ranging from 15° to 75°. In this embodiment, the angle $\theta$ is 30° so as to accommodate and support documents such as billing statement ledger cards against surface projections 40 and 42. The invention requires at least one surface projection. This prevents, for instance, billing statement ledger cards from sliding off and away from the inclined surface 38. The transparent document exposure access 44 is a copy window having a transparent surface such as a acrylic plastic or glass mounted flush in support base 48 which permits exposure of a document to be photocopied. The exposure access 44 coincides with a glass bed plate on the reciprocating document carriage 12, which reciprocally traverses the exposure station 44 of the photocopy machine 14. The flat portion 54 between the exposure station 44 and the recess inclined stacker tray 46 permits the sliding of documents such as billing statement ledger cards from the exposure station 44 to the recessed inclined stacker tray 46. The inwardly recessed inclined stacker tray 46 is at an acute angle to the exposure station 44 with underneath access to documents through an opening 56. Stacking tray 46 may be any generally horizontal surface portion adjacent the other end of the support base 48 for receiving statement ledger cards after they have been photocopied. A rear wall 58 contains documents during manual transfer from the recessed inclined staging tray 36 across the inclined surface 38 and the exposure access 44 to the recessed inclined stacker tray 46. Cutout 60 accommodates the copy sheet length selector knob 34. Rear projection 62 and 64 shown in FIGS. 2 and 3 but not in FIG. 1 mate with indentations in reciprocating carriage 12. A stacker detent 66 extends downwardly from the document support apparatus 10 and mates with the left edge of the reciprocating document carriage 12. A lip 68 extends downwardly from the right edge of the document support apparatus 10 to mate the right edge of reciprocating document carriage 12.

PREFERRED MODE OF OPERATION

Before documents such as billing statement ledger cards are photocopied, it is first necessary to separate the documents such as the ledger cards from general files which are to be photocopied whereupon the documents to be photocopied are placed against the steeply inclined feeder surface 38. For maximum efficiency in photocopying documents such as ledger statement cards, the grouping of cards initially placed onto the inclined surface 38 should not be thicker than the distance from the bottom edge of the inclined surface 38 to the document retainer surface projections 40 and 42. Any excess cards that will not be supported by the inclined surface 38 prior to photocopying are placed on staging area 36 for storage prior to being placed on the inclined surface 38 for photocopying. If the cards to be copied are smaller than copy exposure access 44, it is necessary to mask off copy exposure window 44 with some type of opaque material such as masking tape, etc. Copy exposure access 44 is manufactured with a width of 6½ inches to accommodate a larger than standard size of a 5½ inches width billing statement ledger card which can then be masked down or manufactured with strips of perforated or tear away material such as cardboard or adhesive tape to accept any width of ledger statement card including the standard width 5½ inches statement ledger card. If the length of the document is shorter than 8½ inches, it would then be necessary to mask the window 44 to accommodate a shorter length document.

Prior to photocopying a blanket pad, rubber or otherwise, which covers reciprocating document carriage 12 of photocopy machine 14 is removed. The copy sheet length selector knob 34 is set to accommodate the width of the statement to be photocopied within the range of 5½ to 6½ inches. The document support apparatus 10 is placed onto the reciprocating document carriage 12 so that the stacker detent lip 66 overhangs the left edge of the reciprocating document carriage 12 and the staging area outside the lip 68 overhangs the right edge of the reciprocating document carriage 12 shown in FIGS. 2 and 3 of the drawings.

Now making reference to FIGS. 2 and 3 of the drawings, cross-sectional views of FIG. 1, a stack of cards 70 to be photocopied are placed printed side against the inclined surface 38 having the lower end resting against the document retained surface projections 40 and 42, 42 which is not shown in FIGS. 2 and 3. Extra statements 72 are to be stored in staging area 36.

For operation, the operator stands in front of the photocopy machine 14 so that his left hand is in line with the copy exposure access 44 and his right and is in line with steeply inclined surface 38. A first statement 74 as shown in FIG. 3 is advanced to be positioned directly over copy exposure access 44 printed side down from the top of the stack resting against the inclined surface 38 and against rear guide wall 58 with the operator's left hand centered on this document. NUMBER OF COPIES selector 32 is set to the quantity of statements to be photocopied each particular time or on a countinuous mode of photocopying. POWER switch 28 is turned "on" and PRINT switch 30 is pressed with the operator's right hand to begin reciprocation of the document carriage 12. Photocopying of the statement 74 begins when reciprocating document carriage 12 has traveled to the right thereupon returning to a left position, and ends when carriage 12 has returned to its left-most position.

As the reciprocating document carriage 12 begins a new photocopy cycle to the right, statement 74 is slid leftward from the copy exposure access 44 to recessed inclined stacker tray 46 by the operator's left hand and simultaneously the next statement is slid down inclined surface 38 over statement retaining protusions 40 and 42 to copy exposure access 44 which assist in feeding a single document and separating the single document being fed from the stack of cards 70 by buckling the fed edge of the card 74 to separate it from the stack 70.

The operator's hands are then repositioned at the beginning of the photocopy cycle so that the left hand is on the statement being photocopied and the right hand is on the next statement to be fed to copy exposure access 44. The left to right motion of photocopy machine 14 facilitates the feeding through of statements 74 from stack 70 to copy exposure access 44 and manipulates the stacking of photocopied statement ledger cards at stacker 46. These steps are continually repeated to photocopy each statement ledger card resting against inclined feeder surface 38 on each reciprocation movement of the document carriage. One statement ledger card is photocopied for each reciprocation movement.

After the desired number of statement ledger cards has been photocopied, copy sheet length selector knob 34 is reset to any length such as 11 inches, for example, NUMBER OF COPIES selector 32 is reset to 1 and POWER switch 30 is turned off. The original documents can be refiled in appropriate file locations and the photocopied statements can be processed such as for mailing. The document support apparatus 10 can be removed for reciprocating carriage 10 by lifting upward and stored until its next use.

Various modifications are contemplated and may obviously be resorted to by those skilled in the art without departing from the spirit and scope of the invention, as hereinafter defined by the appended claims, as only a preferred embodiment thereof has been disclosed. For instance, staging tray 36, a generally horizontal surface portion adjacent one end of the support base is not necessary for the operation of the apparatus 10 as statement ledger cards may be staged or stored at any convenient location. In lieu of two document surface projections 40 and 42, any desired number of projections may be utilized. Transparent document copy exposure access 44 may be a rectangular cutout in support base 48 with no transparent support material such as glass or plastic mounted flush into the support base 48.

What is claimed is:

1. Document handling device for facilitating manipulation of a plurality of documents for successively copying said documents on a copying machine having a reciprocating document carriage operating with a copying stroke and a reverse non-copying stroke, said device comprising:
   A. a generally rectangular body member dimensioned to rest upon the reciprocating document carriage of a photocopying machine,
   B. a substantially steeply inclined surface portion adjacent one end of said body member for supporting documents thereon in an inclined stack,
   C. means to prevent said documents from sliding down said inclined surface,
   D. access means in said body member for permitting illumination from the copying machine to strike the undersurface of said documents as the document carriage reciprocates with said body member positioned thereon, and
   E. a generally horizontal surface portion adjacent the other end of said body member for receiving documents after they have been copied, whereby documents are simultaneously fed by an operator from the inclined stack to said access means and from said access means to said receiving surface during the reverse or non-copying stroke of the document carriage without necessity for substantial movement by the operator.

2. Document handling device of claim 1 further comprising a generally horizontal surface adjacent one end of said body member and said inclined surface portion for receiving documents prior to copying.

3. Document handling device of claim 1 further comprising a rear wall attached to said generally rectangular body member, whereby said rear wall assists the feeding of said documents from said inclined portion to said access means thereupon to said generally horizontal surface portion.

4. Document handling device of claim 1 wherein angle $\theta$, of said inclined surface portion is from 15° to 75°.

5. Document handling device of claim 1 wherein angle $\theta$ of said inclined surface portion is 30°.

6. Document handling device of claim 1 further comprising a transparent copy exposure window covering said access means.

7. Document handling device of claim 6 wherein said transparent copy exposure window comprises plastic.

8. Document handling device of claim 6 wherein said transparent copy exposure window comprises glass.

9. Document handling device of claim 1 wherein said sliding prevention means comprises at least one document retainer surface projection projecting from said body member and located between said inclined surface portion and said access means, whereby a top document of said inclined stack of documents abuts against said projection retaining stack in position against said inclined surface portion and is separated from said stack by said projection when being fed to said access means.

* * * * *